June 26, 1956 M. J. PROPST ET AL 2,752,167
SPRING FORK STRUCTURE FOR BICYCLES
Filed Nov. 22, 1952 2 Sheets-Sheet 2
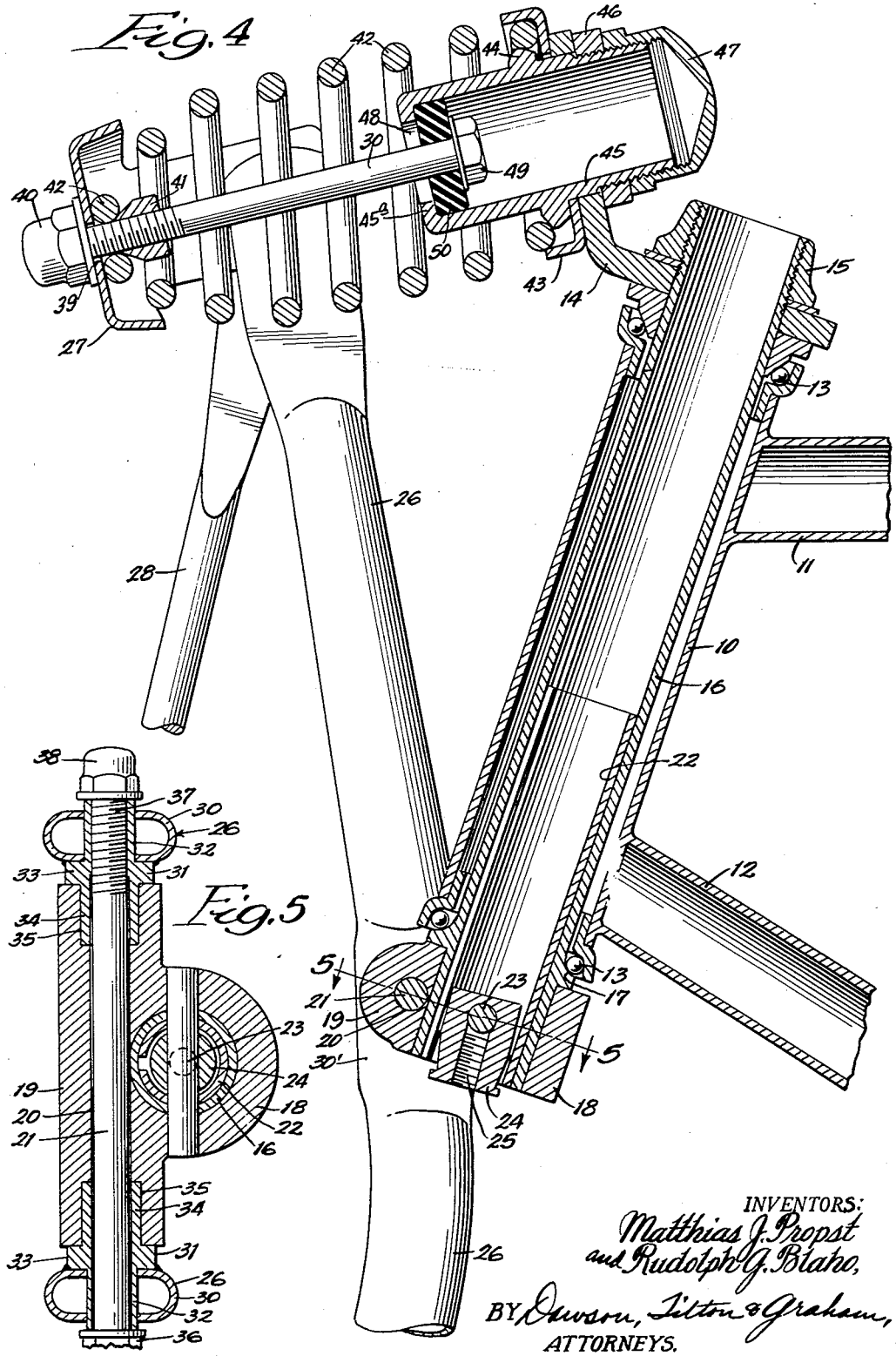
INVENTORS:
Matthias J. Propst
and Rudolph G. Blaho,
BY Dawson, Tilton & Graham,
ATTORNEYS.

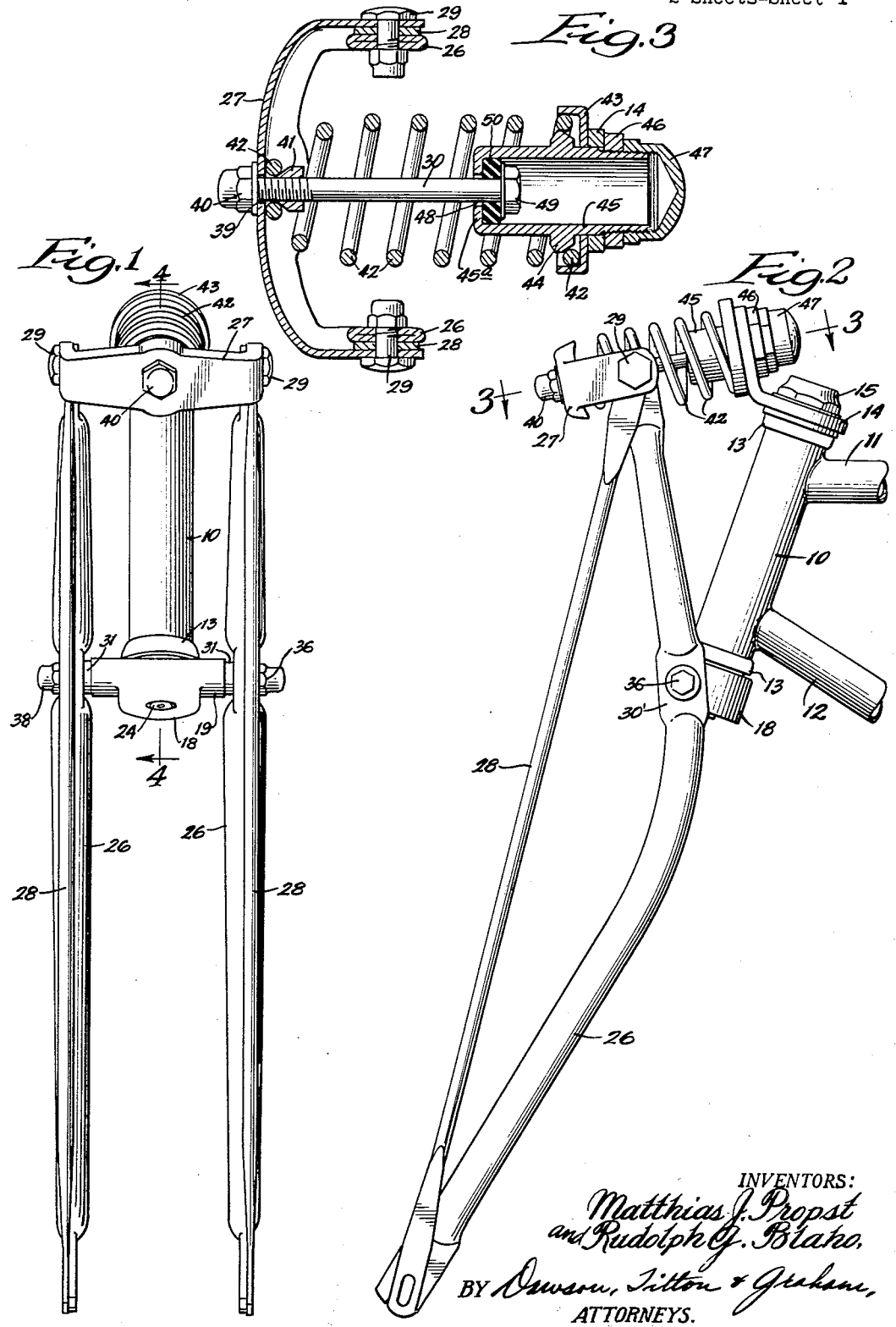

United States Patent Office 2,752,167
Patented June 26, 1956

2,752,167

SPRING FORK STRUCTURE FOR BICYCLES

Matthias J. Propst and Rudolph G. Blaho, Chicago, Ill., assignors to Monark Silver King, Inc., Chicago, Ill., a corporation of Delaware Application November 22, 1952, Serial No. 322,105

9 Claims. (Cl. 280—276)

This invention relates to a spring fork structure for bicycles. Certain portions thereof are obviously useful for other structures.

An object of the present invention is to provide a spring fork structure for bicycles and the like, in which the spring at the forward end of the structure provides a resilient cushioning action whether the thrust against the wheel be from either direction. Another object is to provide for a new and effective operation which substantially eliminates shocks from the wheel to the frame of the bicycle. A further object is to provide a novel pivot and bushing structure for supporting the forks upon the head casting or tube of the bicycle. Yet another object is to provide a spring fork structure in which the fender support is pivotally mounted within the tubular structure in the head castings or tubes. A still further object is to provide a spring fork structure wherein the parts thereof contribute to effective cushioning of the frame from the shocks imparted to the front wheel while at the same time allowing easy steering of the front wheel and a sturdy support for the bicycle frame. Other specific objects and advantages will appear as the specification proceeds.

The invention is shown in an illustrative embodiment by the accompanying drawing, in which—

Figure 1 is a front view in elevation of a spring fork embodying my invention; Fig. 2, a side view in elevation; Fig. 3, a detail sectional view, the section being taken as indicated at line 3—3 of Fig. 2; Fig. 4, a vertical sectional view, the section being taken as indicated at line 4—4 of Fig. 1; and Fig. 5, an enlarged detail sectional view, the section being taken as indicated at line 5—5 of Fig. 4.

In the illustration given, 10 designates the head casting or tube of a bicycle provided with the usual rearwardly-extending frame tubes 11 and 12. The frame members 10, 11 and 12 may be of any suitable construction and provide the usual ball bearings 13, as shown more clearly in Fig. 4. A bracket support 14 is carried at the upper portion of the head structure 10 and locked in position by the nut 15. The inner tube member 16 provides a threaded portion for engagement with the nut 15 and at its lower side provides a ball bearing seat 17. A ring support 18 encloses the lower end portion of the inner tube member 16 and the ring is welded to or formed integrally with a forwardly-extending hub 19 which is apertured at 20 to receive a pivot pin 21, as shown more clearly in Fig. 4.

Within tube 16 extends a short tube 22. A pivot pin 23 extends through a fender support 24, the support 24 having a threaded opening tapped therein at 25 to receive a screw which passes through the fender and thus secures the fender upon the pivotally-mounted part 24.

A pair of tubular forks 26 extend upwardly from the axis of the front wheel (not shown) and are secured at their upper ends to a yoke member 27. Similarly, the front stays 28 extend upwardly and are connected to the forks 26 and to the yoke 27 by bolts 29. At an intermediate point 30', the tubular members 26 are flattened and are secured to bushings 31. The bushings 31 have integral outwardly-extending tubular portions 32 extending through the fork members 26, intermediate portions 33 which are preferably welded to the tubular parts 26, and inwardly-extending tubular portions 34 received within recesses 35 of the hub 19. The hub 19 may be formed integrally with the ring 18 or, if desired, welded thereto. A bolt 21 holds the parts together, as indicated in Fig. 5, with its head 36 at one end of the assembly and the other threaded end 37 of the bolt being engaged by a nut 38.

The yoke 27 is centrally apertured at 39 to receive a bolt 30, the bolt being threaded at both ends. The outer end of the bolt 30 is engaged by a nut 40, while an inner nut 41 secures the inner end of the spring 42 against the yoke 27. The inner end of the spring 42 is secured to an angular portion of the bracket 14 by a clamping collar 43 on the outer side and an inclined shoulder 44 formed integrally with a drum 45. Nuts 46 and 47 urge the cup 43 tightly against the shoulder 44 to lock the inner ends of the spring 42 tightly upon the drum. The inner end wall 45a of the drum 45 is apertured at 48 to receive the spring rod 30. A nut 49 closes the end of the rod 30 and is spaced from the end wall 46 of the drum 45 by the resilient apertured pad 50.

Operation

In the operation of the structure, the spring fork is united with the bicycle in the usual way. As the front wheel of the bicycle receives a thrust against the inner side of the wheel forwardly, the forks 26 at their lower ends move forwardly and, pivoting upon the intermediate pivot 21 on a transverse axis relative to head portion 10 and tube 16, the upper ends of the tubular forks 26 draw the yoke 27 rearwardly and cause the loose bolt 30 to move rearwardly into drum 45 and against the spring 42 to compress it. Thus the movement of the yoke rearwardly is cushioned by the action of spring 42. The inner end of the rod 30 and the nut 49 move inwardly within the drum 45.

When the wheel meets an obstacle at the front thereof, the lower ends of spring forks 26 move rearwardly, causing the yoke 27 to pull the spring 42 forwardly. Normally the resilient member 50 and the nut 49 on the inner end of the bolt 30 are located about midway of the drum 45 and when the spring 42 is drawn forward stretching the springs, the members 50 and 49 move forwardly. Should the springs 42 be drawn forwardly an unusual length, the cushioning member 50 will strike the forward wall 45a, limiting the forward movement of the rod 30, as shown more clearly in Fig. 3. Wear about the pivot rod 21 is prevented by employing the bushing 31 at each end thereof, and as shown more clearly in Fig. 5. A sturdy support for the flattened portion of the tubular fork members 26 is provided while at the same time the fork members may swing with the bushing about the bolt 21 and within the hub 19. An accurate alignment of the wheel fender in securing same to the frame is provided by the tapped member 24 pivotally supported upon the pin 23, as shown more clearly in Fig. 4. By supporting the hub 19 forwardly of the head member 10 and ring 18, a very effective steering action is brought about while avoiding interference with the action of the spring fork structure.

While, in the foregoing specification, we have set forth a specific structure in considerable detail for the purpose of showing one embodiment of the invention, it will be understood that such details of structure may be varied widely by those skilled in the art without departing from the spirit of our invention.

We claim:

1. A spring fork structure for a bicycle, comprising a head frame portion having a pivot pin extending through the lower central portion thereof, a fender support pivotally mounted upon said pivot pin and having a tapped opening in the lower portion thereof, a hub extending forwardly of the lower portion of said head frame portion and apertured to receive a bolt, fork members at each end of said hub and being pivotal relative thereto, bolt means extending through said fork members and said hub, and a nut secured to one end of said bolt, a yoke above said fork members and secured to the ends thereof, a drum secured upon the upper portion of said head frame portion and having an apertured inner wall, a bolt secured at one end to said yoke and having its other end extending through the apertured wall and slidable freely within said drum, a resilient member secured to the inner end of said bolt, and a coil spring fixedly secured to said yoke and to said drum, said fender support being pivotal in the same direction as said fork members.

2. In combination with a bicycle frame having a head portion adapted to provide a pivotal mounting for bicycle fork members including a tube rotatably secured therein, a fender support pivotally carried in said tube of said head portion and being adapted to provide a mounting for a bicycle fender, said fender support being pivotal along the transverse axis of said bicycle frame, in predetermined closely spaced relation to the lower opening of said tube and having a diameter slightly less than the internal diameter of said tube.

3. A spring fork structure for a bicycle, comprising a head frame portion having a pivot pin extending transversely thereacross, a fender support carried by said pivot pin for pivotal movement about the longitudinal axis thereof and being constructed and arranged to have a fender secured thereto, a hub mounted forwardly of said head frame portion adjacent the lower end thereof and being apertured to receive a mounting pin, a fork member at each end of said hub and being carried by said mounting pin for pivotal movement relative to the hub, a yoke secured to the upper ends of said fork members, a drum secured to the upper end of said head frame portion and having an apertured inner wall, a bolt secured at one end to said yoke and extending through said apertured wall and being slidable freely within said drum, and a spring extending between said yoke and said drum, said fender support and said fork members being pivotal about generally parallel axes.

4. The spring fork structure of claim 3 in which a resilient member is slidably received within said drum and is secured to said bolt for engagement with said apertured inner wall of the drum.

5. In a spring fork structure adapted for use with a bicycle having a frame equipped with a head frame portion, a tube rotatably mounted within said head frame portion, a pivot pin extending transversely through said tube adjacent the lower end thereof, a fender support pivotally carried by said pin and being constructed and arranged for having a fender secured thereto, a hub extending forwardly of said tube adjacent the lower end thereof, a fork member mounted at each end of said hub and being pivotal relative thereto about an axis substantially parallel to the longitudinal axis of said pivot pin, a yoke adjacent the upper end of said head frame portion and being spaced forwardly thereof, said yoke being secured to said fork members, a drum carried by said head portion adjacent the upper end thereof, a bolt secured at one end to said yoke and slidably extending into said drum, and a coil spring seated at one end against said yoke and at its other end against said drum to bias said yoke forwardly with respect to the drum.

6. The spring fork structure of claim 5 in which said drum is provided with a forward wall having an opening therein through which said bolt is slidable, and in which said bolt has secured thereto within said drum a resilient pad adapted to abut said forward wall and arrest forward movement of said yoke with respect to said drum.

7. The structure of claim 5 in which said pivot pin is spaced from the lower end of said tube, and in which said fender support is received within said tube and is dimensioned transversely with respect thereto to afford pivotal movement of the fender support member within the tube.

8. In combination with a bicycle frame having a head portion adapted to provide a pivotal mounting for bicycle fork members, a tube rotatably carried by said head portion, a pivot pin extending transversely through said tube a spaced distance from the lower end thereof, and a fender support pivotally carried by said pin and being adapted to provide a mounting for a bicycle fender, said fender support being positioned for the most part within said tube and being dimensioned to afford limited pivotal movement thereof about said pivot pin and within said tube.

9. In combination with a bicycle frame having a head portion including an upwardly extending tube pivotal about the upwardly extending axis of said head portion, a fender support member pivotally mounted within said tube adjacent the lower end thereof for swinging movement about an axis extending transversely across said tube, said fender support member having a cross sectional dimension smaller than the tube whereby the fender support member may pivot within the limits defined by said tube.

References Cited in the file of this patent

UNITED STATES PATENTS

| | | |
|---|---|---|
| 2,160,034 | Schwinn | May 30, 1939 |
| 2,188,968 | Uber | Feb. 6, 1940 |
| 2,550,876 | Spencer | May 1, 1951 |
| 2,590,050 | Smith | Mar. 18, 1952 |

FOREIGN PATENTS

| | | |
|---|---|---|
| 415,752 | Germany | June 27, 1925 |
| 544,594 | France | June 28, 1922 |